Dec. 26, 1939.   C. E. JOHNSON   2,184,673
CONTROL FOR VARIABLE-DIAMETER PULLEY
Filed Nov. 8, 1937
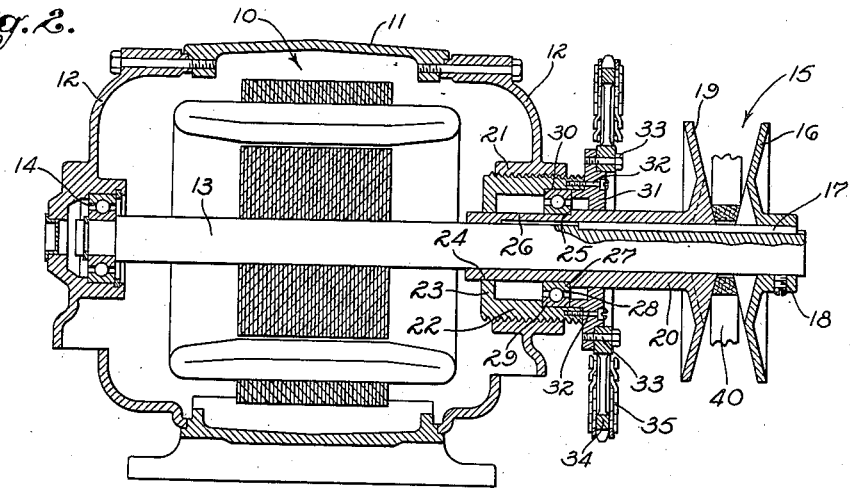
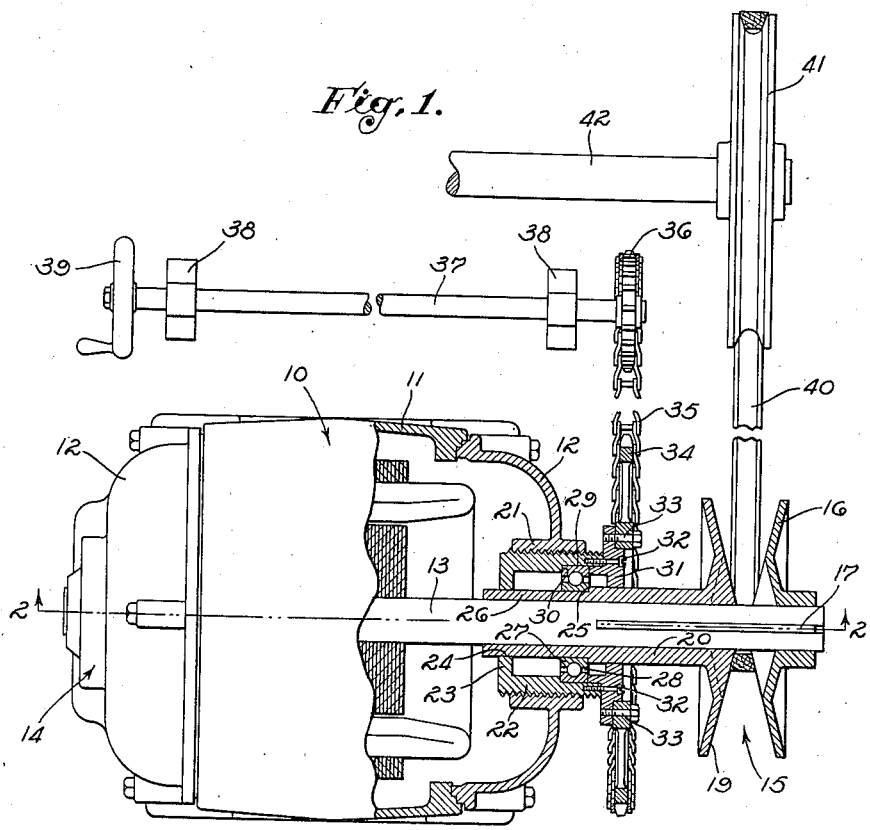
INVENTOR
CARL E. JOHNSON
BY HARRIS, KIECH, FOSTER & HARRIS Patented Dec. 26, 1939

2,184,673

UNITED STATES PATENT OFFICE 2,184,673

CONTROL FOR VARIABLE-DIAMETER PULLEY

Carl E. Johnson, Pasadena, Calif.

Application November 8, 1937, Serial No. 173,354

3 Claims. (Cl. 74—230.17)

My invention relates in general to power devices adapted to drive machinery at variable speeds, and relates particularly to power devices having variable-diameter belt and pulley transmission means.

The objects of my present invention are in general to provide in variable-speed power devices having one or more variable-diameter pulleys simple means whereby the variable-diameter pulley or pulleys may be quickly and positively adjusted to produce a desired speed of a power output or power delivery shaft which is adapted to be connected to a power utilizing device in accordance with the known practices of coupling, gearing, or belting; to provide a simple and effective arrangement of cooperating elements necessary to produce a variable-speed power device in which the pulleys will be at all times properly aligned, thereby minimizing belt wear; to provide in devices of the foregoing character means for automatically aligning the adjustable-diameter pulleys in accordance with the adjustment of the variable-diameter pulleys in changing the effective diameters thereof; and to produce certain important improvements in the construction of variable-speed power devices as hereinafter set forth.

This is a continuation-in-part of my copending application Serial No. 668,772, filed May 1, 1933, for Variable-Speed Power Device.

It is a further object of the invention to provide a new and improved manually or mechanically adjusted V-belt pulley structure, and to provide a V-belt pulley structure which may be mounted on a motor shaft and will require a minimum of space outside the motor structure.

Still another object of the invention is to provide a variable-diameter V-type pulley on the shaft of an electric motor so that the inside pulley flange is movable, being moved axially by a bearing member engaging the movable flange and movable in the motor housing, there being means provided for axially moving the bearing member.

Further objects and advantages of the invention will be evident from the specification and the drawing, which is for the purpose of illustration only, and in which:

Fig. 1 is a diagrammatic plan view, partly in section, of my novel device.
Fig. 2 is an elevational sectional view taken on the line 2—2 of Fig. 1.

Referring to the drawing, I show an electric motor 10 having a housing 11 provided with end bells 12 and having a drive shaft 13 supported in one of the end bells by a suitable bearing 14 carried therein. The other end of the drive shaft 13 extends out of the electric motor 10 and carries thereon a variable-diameter pulley 15 of the V-type well known in the art. The variable-diameter pulley 15 has an outer fixed flange 16 fixed to the drive shaft 13 as by means of a key 17 provided in a suitable keyway and a set screw 18. The variable-diameter pulley 15 is also provided with an inside movable flange 19 suitably keyed on the key 17 so as to be held against rotation relative to the drive shaft 13 but being adapted to be axially moved thereon. The movable flange 19 is provided with a sleeve 20 fixed thereon or formed integrally therewith extending leftwardly or inwardly therefrom into the confines of the outer end bell 12 of the electric motor 10. The outer end bell 12 is provided with a tubular flange 21, internally threaded to receive an externally threaded bearing member 22. The bearing member 22 has an end wall 23 with an opening 24 therein through which the inner end of the sleeve 20 extends. Between the end wall 23 and a shoulder 25 formed on the sleeve 20, the sleeve has a diametrally reduced portion 26 adapted to slide through an inner race 27 of a bearing 28 which is secured within the bearing member 22 and is adapted to be moved axially in response to axial movement of the bearing member. A simple manner of securing the bearing 28 within the bearing member 22 is, as shown, to seat the outer race 29 thereof against an internal shoulder 30 within the bearing member by means of an end member 31 which may be secured to the rightward open end of the bearing member by means of screws 32. Preferably fixed to the outer face of the end member 31, as by screws 33, is a sprocket 34 engaging the links of a chain 35 which also passes over a control sprocket 36 carried by a control shaft 37 suitably supported by bearing brackets 38 and provided with a hand wheel 39 by which the control shaft may be operated.

Carried between the fixed and movable flanges 16 and 19, respectively, of the variable-diameter pulley 15, is a belt 40, preferably of the resilient V-type, which operatively connects the variable-diameter pulley and a V-type driven pulley 41 carried by a driven shaft 42.

The drive shaft 13 may rotate in consequence of the actuation of the electric motor 10, but is prevented from moving axially by the bearing 14, the outer end of the drive shaft being rotatably supported by the bearing 28 which is mounted upon the diametrally reduced portion 26 of the sleeve 20. It is thus apparent that the outer end of the drive shaft 13 is rotatably supported by the bearing 28 carried in the bearing member 22, which is a feature of the invention.

In the operation of the device, the belt 40 operating in the V-groove formed between the flanges 16 and 19 of the variable-diameter pulley 15 exerts a pressure to force the movable flange 19 leftwardly so as to hold the shoulder 25 of the sleeve 20 against the inner race 27 of the bearing 28. The bearing member 22 may be screwed inwardly or outwardly in the tubular flange 21 by rotating the hand wheel 39 and the control shaft 37 connected thereto, which operates through the sprocket 36 and the chain 35 to rotate the bearing member in the tubular flange. If the bearing member 22 is screwed farther into the tubular flange 21, the lateral force exerted by the belt 40 will force the movable flange 19 leftwardly to an extent permitted by the position of the bearing 28 as controlled by the position of the bearing member 22. When the bearing member 22 is rotated so as to screw outwardly relative to the tubular flange 21, the bearing member will be moved rightwardly, thereby forcing the sleeve 20 and the movable flange 19 associated therewith toward the fixed flange 16, thereby reducing the width of the V-groove formed between the flanges 16 and 19 and causing the belt 40 to move outwardly on the pulley flanges so as to provide a greater effective diameter of the variable-diameter pulley 15, thereby changing the speed ratio between the variable-diameter pulley 15 and the driven pulley 41.

It will be understood that the bearing 28 is both a radial bearing and a thrust bearing, it rotatably supporting the outer end of the drive shaft 13 and providing a thrust bearing between the sleeve 20 and the bearing member 22. It will also be understood that the bearing member 22, the end member 31, and the sprocket 34 comprise a simple and efficient adjustment means for adjusting the diameter of the variable-diameter pulley 15. By reason of the structure and location of these elements, the adjustment means of the invention is positioned partially within the outer end bell 12 of the electric motor 10, no adjustment mechanism being necessary on the outer end of the drive shaft 13 beyond the variable-diameter pulley 15, thus conserving space materially and guarding against accidental actuation of the adjustment means. It will be appreciated that while I have shown a chain 35 and sprocket 36 adapted to rotate the sprocket 34 and consequently the adjustment means of the invention, the chain 35 and sprocket 36 may be omitted and a hand wheel substituted for the sprocket 34 where remote control of the adjustment means is not required. Likewise, it may be desired to utilize other mechanism for moving the bearing member 22 into or out of the tubular flange 21 to vary the position of the movable flange 19, and any mechanism adapted to such purpose is within the scope of the present invention.

Although I have herein shown and described my invention in simple and practical form, it is to be recognized that certain parts or elements thereof are representative of other parts, elements, or mechanisms which may be used in substantially the same manner to accomplish substantially the same result; therefore, it is to be understood that the invention is not to be limited to the details disclosed herein but is to be accorded the full scope of the following claims.

I claim as my invention:

1. In a variable-speed transmission device, the combination of: an electric motor having a case; a cylindrical flange on one end of said case; a motor drive shaft extending through said cylindrical flange and outside of said case; a variable-diameter pulley of the V-type on said drive shaft having a fixed flange and a movable flange axially movable on said drive shaft; a sleeve element rigidly connected to said movable flange and journalling said drive shaft; a bearing member supported by and axially movable in said cylindrical flange, having bearing means adapted to journal said sleeve and to transmit axial movement of said bearing member to said sleeve so as to adjust the axial position of said movable flange on said drive shaft; and adjustment means for axially moving said bearing member.

2. In a variable-speed transmission device, the combination of: an electric motor having a case; a cylindrical flange on one end of said case; a motor drive shaft extending through said cylindrical flange and outside of said case; a variable-diameter pulley of the V-type mounted adjacent the outer end of said drive shaft having a pair of pulley flanges, one of said flanges being axially movable relative to the other; a sleeve element rigidly connected to said movable flange and journalling said drive shaft; a bearing member supported by and axially movable in said cylindrical flange, having bearing means adapted to journal said sleeve and to transmit axial movement of said bearing member to said sleeve so as to adjust the axial position of said movable flange; and adjustment means for axially moving said bearing member.

3. In a variable-speed transmission device, the combination of: an electric motor having a case; a cylindrical flange on one end of said case; a motor drive shaft extending through said cylindrical flange and outside of said case; a variable-diameter pulley of the V-type mounted adjacent the outer end of said drive shaft having a pair of pulley flanges, one of said flanges being axially movable relative to the other; a sleeve element rigidly connected to said movable flange and journalling said drive shaft; a bearing member threadedly supported in said cylindrical flange, having bearing means adapted to journal said sleeve and to transmit axial movement of said bearing member to said sleeve so as to adjust the axial position of said movable flange; and adjustment means for rotating said bearing member so as to axially move said bearing member.

CARL E. JOHNSON.